(12) United States Patent
Gradishar et al.

(10) Patent No.: US 7,421,464 B2
(45) Date of Patent: Sep. 2, 2008

(54) SYSTEM AND METHOD FOR INTRODUCING DITHER FOR REDUCING SPURS IN DIGITAL-TO-TIME CONVERTER DIRECT DIGITAL SYNTHESIS

(75) Inventors: Thomas L. Gradishar, Boynton Beach, FL (US); Robert E. Stengel, Pompano Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 571 days.

(21) Appl. No.: 10/954,571

(22) Filed: Sep. 30, 2004

(65) Prior Publication Data

US 2006/0069707 A1    Mar. 30, 2006

(51) Int. Cl.
G06F 1/02    (2006.01)
(52) U.S. Cl. .................................... 708/271
(58) Field of Classification Search ......... 708/270–277; 327/105–106
See application file for complete search history.

(56) References Cited

U.S. PATENT DOCUMENTS

| 4,933,890 | A |  | 6/1990 | Nuytkens et al. | |
| 5,459,680 | A | * | 10/1995 | Zimmerman et al. | 708/276 |
| 5,977,804 | A | * | 11/1999 | Beech | 327/105 |
| 6,252,464 | B1 | * | 6/2001 | Richards et al. | 708/271 |
| 6,320,431 | B1 | * | 11/2001 | Potson et al. | 708/270 |
| 7,143,125 | B2 | * | 11/2006 | Gradishar et al. | 708/271 |
| 2006/0267640 | A1 | * | 11/2006 | Travis | 327/105 |

* cited by examiner

Primary Examiner—Tan V Mai

(57) ABSTRACT

A direct digital synthesizer (DDS) (300) that uses a system for reducing spurious emissions in a digital-to-time converter (DTC) (317). The DDS (300) includes one or more dither sources (307) and a random access memory (RAM) (305). The RAM (305) utilizes a look-up table for storing delay error values by using an output of the look-up table which is combined with the dither source (307) to compensate unequal unit delay values in the DTC (317).

25 Claims, 6 Drawing Sheets

300

300

500

SYSTEM AND METHOD FOR INTRODUCING DITHER FOR REDUCING SPURS IN DIGITAL-TO-TIME CONVERTER DIRECT DIGITAL SYNTHESIS

TECHNICAL FIELD

This invention relates in general to direct digital synthesizer (DDS) circuits that are based on a digital-to-time converter (DTC) and more particularly to the use of dither to reduce spurs in the spectrum of the DDS output.

BACKGROUND

A direct digital synthesis (DDS) synthesizer circuit often incorporates a digital-to-time converter (DTC) to produce a square wave at its output. The output of the DDS based on a DTC can be used in a radio transceiver to provide a local oscillator (LO) signal. Although common problems often associated with using a DDS involve a tolerable spurious emissions level (spurs) and noise floor, the use of DDS in a radio transceiver also offers many benefits since the DDS output frequency can be tuned over a very wide range with zero lock time.

With regard to spurious emissions by the DDS, there are two sources of error that cause spurs in the spectrum of the output square wave. These sources of error include both mismatch error and quantization error. Mismatch error refers to the DTC error that is due to process mismatch delay and locked loop error. Quantization error is the error or distortion introduced through the quantization process. Although there are existing methods that use dither to eliminate the contribution of the quantization error to the spurs it does nothing to mitigate the mismatch error. As is well known in the art, dithering is done by adding noise of a level less than the least-significant bit before rounding. The added noise has the effect of spreading the many short-term errors across the spectrum as broadband noise. Small improvements can be made to a dithering algorithm such as shaping the noise to areas where it is less objectionable, but the process remains simply one of adding the minimal amount of noise necessary to increase performance.

One example of this type of dithering approach is shown in U.S. Pat. No. 4,933,890 which is herein incorporated by reference. Prior art FIG. 1 illustrates a DDS 100 used for quantizing the output of a digital block 101. A low level noise, or dither, is injected using a dither source 103 to an adder 105 in order to eliminate the quantization error from being periodic. The quantizer 107 rounds the sum of the digital block 101 and dither source 103 to the nearest multiple of $2^{-m}$, where m is the bit width of the input of the DTC 111.

Prior art FIG. 2 shows timing diagrams for the DDS 100. Line A shows the reference clock. Line B shows the v(n) output of the digital block 101, a succession of fractional numbers with k bits after the point. Line C shows the en1(n) output of the digital block, an enable signal for indicating clock cycles that are enabled to produce a pulse. The outputs of the digital block, v(n) and en1(n), describe a pulse waveform that can be considered an ideal (no quantization or mismatch error) version of the output of the synthesizer. The signal v(n) is proportional to the pulse delays for the pulses contained in the ideal pulse waveform. Line D shows the ideal pulse waveform. It consists of a train of pulses. The pulse width equals $T_{clk}/2$, the same as the pulse width of the reference clock. The rising edges of the pulses are delayed with respect to the rising edges of the reference clock, where the amounts of delay are proportional to the values of v(n). The changes, i.e. updates, in the signals v(n) and en1(n) occur at rising edges of the reference clock. In the interval between 2 rising clock edges, the ideal pulse waveform contains a rising edge only if en1(n)=1. It can be said that en1(n)=1 enables the cycle to produce a pulse, and to position the rising edge of the pulse in time before the end of the cycle. Specifically the pulse is positioned so the time delay from the rising edge of the clock to the rising edge of the pulse equals $v(n) \times T_{clk}$. v(n) is a fractional number between 0 and $1-2^{-k}$.

The bit width of the output of the digital block, k, sets the resolution for delaying the pulses in the idealized pulse waveform, i.e. setting the period of the idealized pulse waveform. In the example waveform of FIG. 2, line D, the period is $(1+3/32) \times T_{clk}$. The period, $T_{out}$, is limited by the resolution for setting the period and by $T_{clk} \leq T_{out} \leq \max\{T_{out}\}$. The maximal $T_{out}$, i.e. $\max\{T_{out}\}$, is due to some hardware or software consideration as will depend on the implementation. Since the output frequency of the idealized pulse waveform, $F_{out}$, is the inverse of $T_{out}$, k also sets the resolution for setting $F_{out}$ in the range $\min\{F_{out}\} \leq F_{out} \leq F_{clk}$, where $\min\{F_{out}\} = (\max\{T_{out}\})^{-1}$.

The bit width of the output of the digital block, k, exceeds the bit width of the input of the DTC, m. In FIG. 2, k=5 because the output of the digital block v(n) is a succession of 5-bit binary numbers (fractional numbers with denominator $2^5$ or 32) and m=3 because the input of the DTC w(n) is a succession of 3-bit binary numbers (fractional numbers with denominator $2^3$ or 8.) Although FIG. 2 is for illustration purposes, a typical application in practice is likely to have bit widths greater than k=5 and m=3. Since the bit width of the output of the digital block exceeds the bit width of the input of the DTC quantization is a requirement, and is carried out by the dither source 103, summer 105, and quantizer 107 as described herein. Because of the quantization, exact timing is not maintained in terms of the pulse delay times. This timing error causes jitter, and the quantization error energy appears in the spectrum of the output of the DTC. Note, however, that the output of the DTC has the same frequency resolution as the idealized pulse waveform, and as mentioned above, this resolution is set by the bit width of the digital block output v(n).

As noted herein, the quantizer 107 rounds the sum of the digital block 101 and dither source 103. Lines E and F show the 2's complement outputs of the dither source and summer. The dither source is a discrete random variable uniformly distributed in the range $-2^{-m-1} \leq d(n) < 2^{-m-1}$.

It will be recognized by those skilled in the art that the limits of the range are plus/minus one-half quantization interval, or $2^{-4}=1/16$ in FIG. 2. Line F shows the 2's complement output of the summer 105. As an example, in the second cycle in FIG. 2 v(n)=3/32. Then v(n)+d(n) is in the range $1/32 \leq v(n)+d(n) < 5/32$, and since the quantizer rounds to the nearest multiple of $2^{-m}$, or 1/8, it follows that q(n)=0 or 1/8.

Thus, it can be shown that the probability that the quantizer rounds to q(n)=0 is 1/4 and to q(n)=1/8 is 3/4. In the ensemble average of cycles with v(n)=3/32, the average error is calculated as $-3/32 \times (1/4) + 1/32 \times (3/4) = 0$.

Those skilled in the art will further recognize that in the ensemble average of a large number of cycles the timing error due to quantization approaches zero. Due to rounding, the quantizer output range is 0 to 1.000 and requires a digit in front of the point. For the DTC input, on the other hand, there is no digit in front of the point and the range is 0 to the binary number 0.111, representing 7/8. w(n)=1.000 is not a valid DTC input. w(n)=1.000 is not typically a valid DTC input for implementations of DTC since if it were valid, it would correspond to a pulse delayed by $T_{clk}$, i.e., one clock period, with respect to the rising edge of clock cycle n. An equivalent pulse can also be produced with w(n+1)=0, i.e. a delay of zero with respect to the rising edge of clock cycle n+1. The signals q(n) and en1(n) couple to the input of the DTC through the modulo block 109. Lines H and I in FIG. 2 show the outputs of the modulo block. In a cycle in which q(n) does not equal 1.000 or don't_care, the modulo block behaves as a transparent pass-through. In other words in such a cycle w(n)=q(n) and en2(n)=en1(n). In a cycle in which q(n)=1.000 the modulo block outputs w(n)=don't_care and en2(n)=0. Furthermore, in the next clock cycle, cycle # n+1, the modulo block outputs w(n+1)=0 and en2(n+1)=1. In a cyle in which q(n)= don't_care, the modulo block passes-through w(n)= don't_care and en2(n)=en1(n)=0 UNLESS q(n−1)=1.000 in the prior clock cycle.

Finally, a high resolution digital-to-time converter (DTC) 111 is used to finely locate each edge of the output signal 113 at the correct instant in the time domain. As is well known in the art, the time resolution of the DTC 111 directly determines the spectral purity of output signal 113. The output signal 113 is a square wave whose spectrum contains spurs and measurable noise floor. The DTC produces a pulse at the output, delayed with respect to the reference clock. Line J of FIG. 2 shows that the width for the pulses is Tclk/2. The ideal amount of time delay may be measured from the rising edge of the reference clock to the rising edge of the output pulse and equals $w(n) \times T_{clk}$.

The mathematical sum of the ideal waveform in line D in FIG. 2 and quantization error shown in Line K, as well as the other error terms such as DTC mismatch error, equals the actual synthesizer output, Out(t). As shown in line K, the quantization error has no pattern. Any pattern in the quantization error would cause spectral lines, or spurs, in the spectrum of Out(t). The dither eliminates the quantization error from having a pattern and therefore eliminates the quantization error from contributing to spurs in the spectrum of Out(t). DTC error is the error in the delay time of the output pulses due to DTC non-idealities. Two types of DTC error are DTC mismatch error and DTC thermal noise or device noise error. DTC mismatch error refers to error that has a discrete distribution, i.e. finite set of possible values, and is correlated with w(n), the signal at the input of the DTC. The DTC mismatch error can for example be due to finite matching accuracy for taps in a DTC implemented using a tapped delay line. For each element in the set of possible w(n) there is an associated element in the set of possible mismatch error values. The mismatch error for a pulse generated in response to w(n) in one cycle equals the element associated with the value of w(n) in the cycle with a probability of 1.0. The DTC thermal noise on the other hand is random, not correlated with w(n). While the dither in the prior art system eliminates the contribution of the quantization error to the spurs, it does nothing to reduce the contribution of the mismatch error to the spurs.

One problem associated with the system as seen in FIG. 1 is that it uses dither where the maximum spur level depends on the DTC error. In a radio receiver, achieving spurious emissions low enough to use the DDS to produce the LO signal requires an extremely accurate DTC. Using current technology, such an accurate DTC is not practical making the prior art system very difficult to use in practical applications.

Therefore, the need exists to provide a DDS with improved quantization error and mismatch to reduce overall spurious emissions.

SUMMARY OF THE INVENTION

The present invention is directed to an improved type of dither that works not only to eliminate the contribution of the quantization error to spurious emissions in a direct digital synthesizer, but also reduces the contribution of the mismatch error to any spurious emissions. In accordance with the invention, the output of a digital block is used to compute an address into table of a random access memory (RAM).

DETAILED DESCRIPTION OF THE PREFERRED EMBODIMENT

Figure 1:
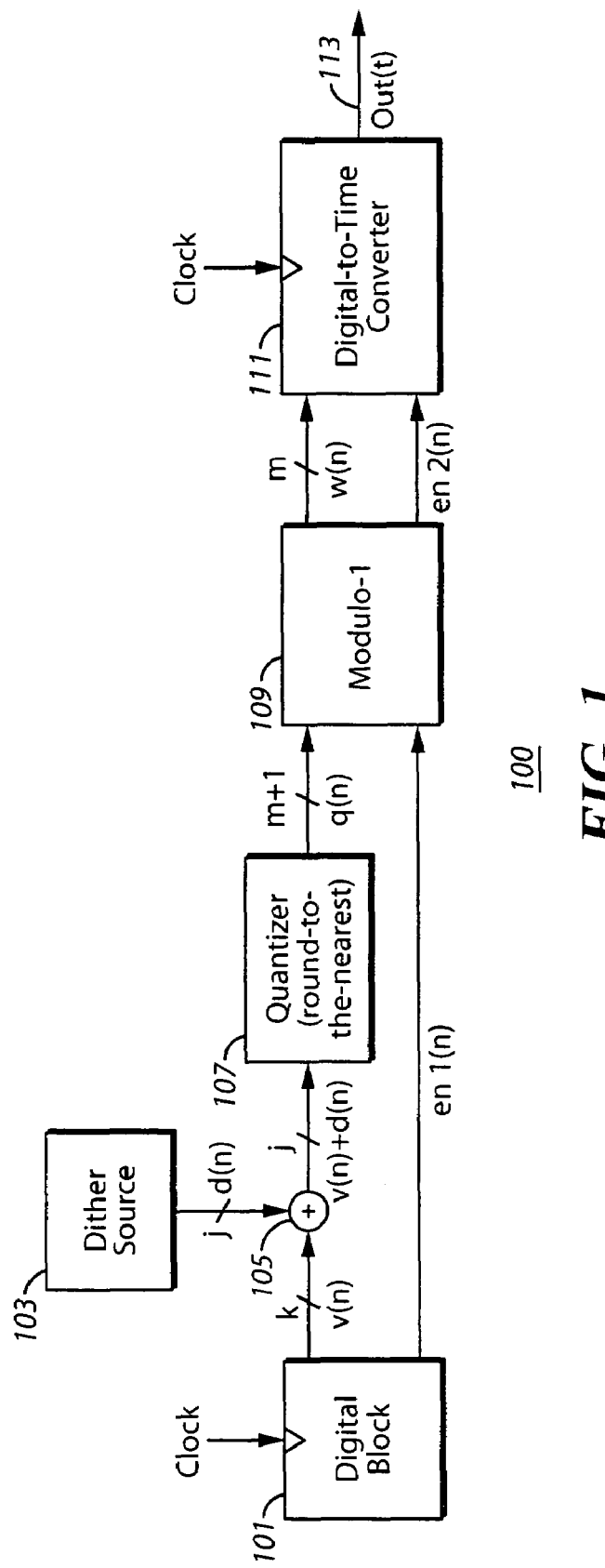
FIG. 1 is a prior art block diagram showing the use of dither in a direct digital synthesizer (DDS).
Figure 2:
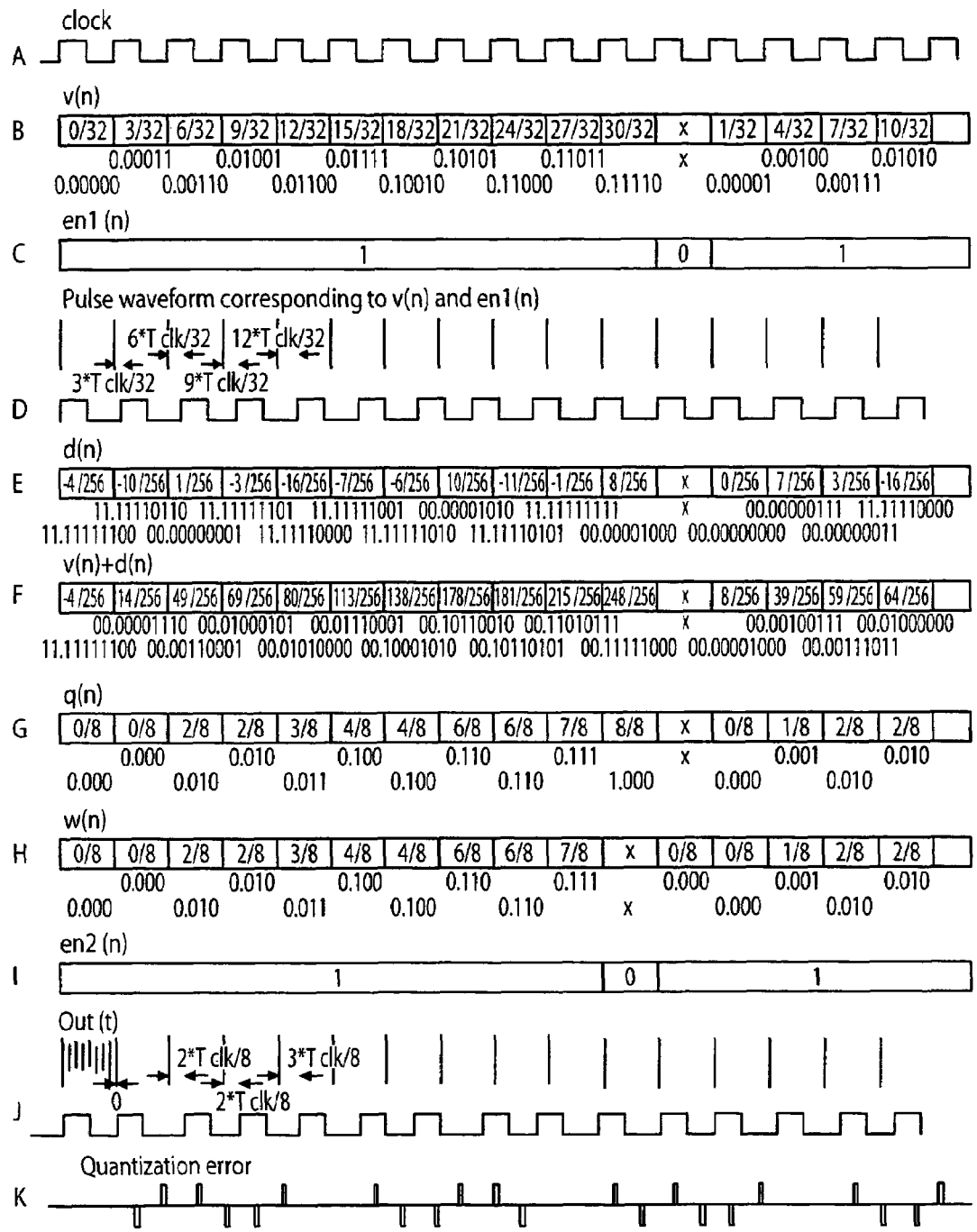
FIG. 2 is a prior art timing diagram for DDS shown in prior art FIG. 1

While the specification concludes with claims defining the features of the invention that are regarded as novel, it is believed that the invention will be better understood from a consideration of the following description in conjunction with the drawing figures, in which like reference numerals are carried forward.

When the timing error for the pulse delays in the DTC output is dominated by quantization error, the prior art dither works to significantly reduce spurs in the spectrum of the synthesizer output through two aspects. First, as described herein, the prior art system breaks up the patterns in the timing error associated with the output pulses that are produced by the synthesizer. Specifically, the synthesizer breaks up patterns in the timing error due to quantization, although it cannot break up patterns in the timing error due to DTC mismatch. Second, as also described herein, in the ensemble average of a large number of output cycles the timing error due to quantization approaches zero. Unfortunately, as the DTC mismatch error increases in magnitude compared to the quantization error, the prior art dither increasingly fails to achieve those two aspects. The prior art dither eliminates the contribution of the quantization error to the spurs, but cannot reduce the contribution of the DTC mismatch error.

This problem is overcome in the present invention by providing a lookup table that maps from $2^k$ equally spaced delays to $2^k$ values for combining with the dither source. As in the prior art system, the digital block output v(n) corresponds to the amount of delay for one pulse in the idealized pulse waveform. In a cycle in which en1(n)=1 (and therefore v(n) is not equal to don't_care) the circuit fetches the look-up table value corresponding to the value of v(n) in the cycle. The fetched value then is combined with the dither source and quantized, and the quantizer output is asserted on the DTC input. The statistics of the quantizer output are controlled by the fetched value. If the fetched value is between two quantization levels, then the value at the quantizer output has a probability P of equaling the quantization level to the left, and a probability 1−P of the one to the right. The look-up table value sets the value of P. Assuming the same value of v(n) occurs in other cycles as well, the average delay for a large collection of cycles containing the value of v(n) is $g_x \times P + g_{x+2^{-m}} \times (1-P)$, where $g_x$ is the actual (including mismatch error) delay the DTC produces for w(n)=x and $g_{x+2^{-m}}$ is the actual delay it produces for w(n)=x+$2^{-m}$. The table value that was fetched controls P, and therefore the average delay. The look-up table value is set as accurately as possible to yield average delay that approaches the ideal amount of delay, i.e. $v(n) \times T_{clk}$.

The values to load in the look-up table are found by first measuring pulse delay at the DTC output versus value of the DTC input, w(n). The measurements are then used in calculations that provide look-up table values. The DTC measurements, look-up table value calculations, and loading the look-up table might be performed one time during manufacture. Alternatively, the device might contain circuits that automatically measure the DTC where a microprocessor is used for calculating the table values and loading the table. This circuit might operate periodically, updating the table at intervals as temperature or supply voltage might change the characteristics of the DTC. If interrupting the synthesizer output is required in order to update the table values, the update might occur in for example the inter-packet time.

Figure 3:
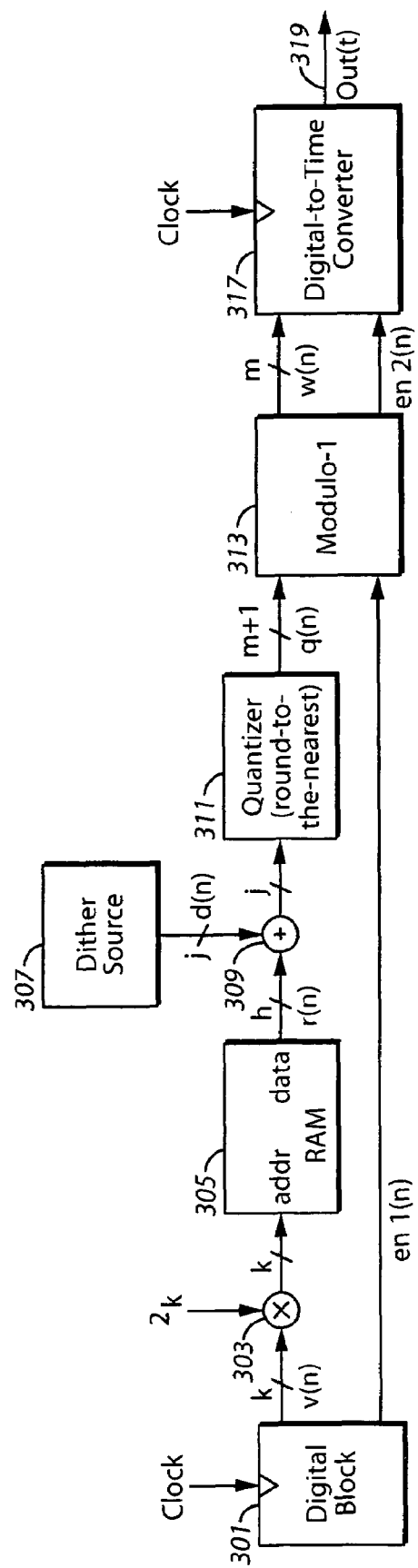
FIG. 3 is a block diagram showing introduction of the dither to reduce digital-to-time converter error in accordance with the invention.

Referring now to FIG. 3, a DDS 300 includes a digital block 301 that works to supply a number that is k bits wide which is input to a multiplier 303. As in the prior art system, the outputs of the digital block, v(n) and en1(n), describe a pulse waveform that can be considered an ideal (unquantized, zero-error) version of the output of the synthesizer. In the interval between 2 rising clock edges, the ideal pulse waveform contains a rising edge only if en1(n)=1. It can be said that en1(n)=1 enables the cycle to produce a pulse, and to position the pulse in time so the rising edge occurs before the end of the cycle. The delay between the rising clock edge and the rising edge of the pulse equals $v(n) \times T_{clk}$, where v(n) is a fractional number between 0 and $1-2^{-k}$. While the RAM requires an integer value at the input, v(n) is a fractional number, so the multiplier works to provide the integer found by shifting the point in v(n) k binary digits. The coefficient of the multiplier is a power of 2, hence the multiplier can be realized by a hardwired shift. The output of the digital multiplier 303 is used as a digital address into a random access memory (RAM) 305. The output of the RAM 305 is supplied to an adder 309 which adds in the dither source 307. The output of the adder 309 is then supplied to the quantizer 311, modulo block 313 and the DTC 317.

Figure 4:
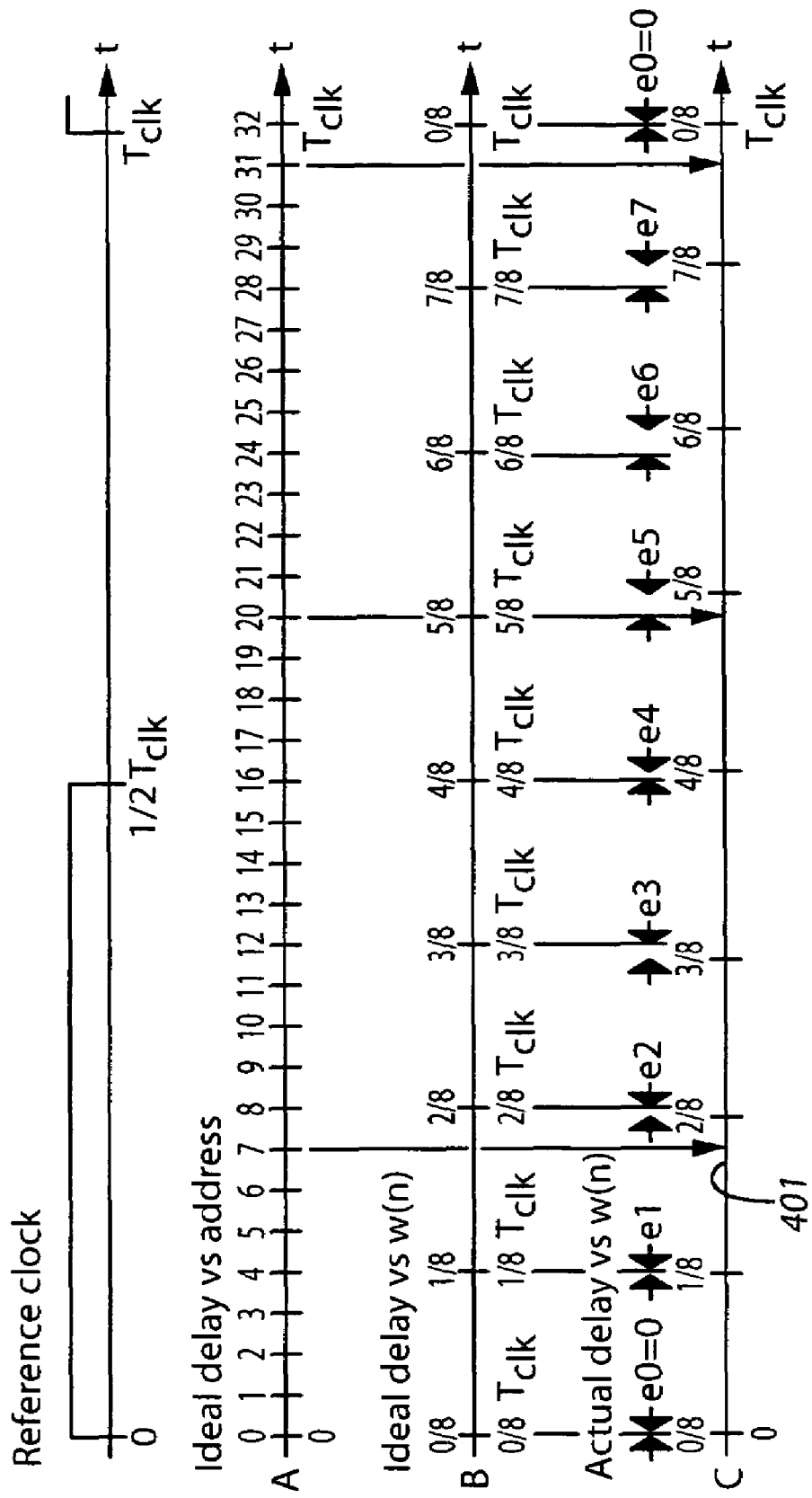
FIG. 4 is a time line graph illustrating ideal delay versus address, ideal delay versus input and actual delay versus input for the digital-to-time converter (DTC) shown in FIG. 3.

As seen in FIG. 4, a time line graph illustrates ideal delay versus address, ideal delay versus the input to the DTC 317 and actual delay versus the input to the DTC 317 as shown in FIG. 3. Line A shows the ideal amount of time delay for the pulse in the idealized pulse waveform versus address for digital block output width, k, equal to 5. As described above, the pulse in the idealized version of the synthesizer output is positioned so the time delay from the rising edge of the clock to the rising edge of the pulse equals $v(n) \times T_{clk}$, or addr×$2^{-k}$×$T_{clk}$. Let D(addr)=addr×$2^{-k}$×$T_{clk}$ denote the ideal delay for address addr. Line B shows the ideal amount of time delay for the pulse the DTC produces versus the DTC input, w(n), for DTC input width, m, equal to 3. The ideal delay from the rising edge of the clock to the rising edge of the output pulse equals $w(n) \times T_{clk}$, where w(n) ranges from 0 to $1-2^{-m}$. Line C of FIG. 4 shows what the actual delay might be where the delay periods are not evenly spaced. Thus the time line shows for 0 to 7 input values to the DTC 317, what amount of delay the DTC actually produces.

The procedure for calculating the lookup table values is outlined below. When the procedure is followed for address 7, as an example, the table value to load at address 7 captures the following information. The ideal time delay corresponding to address 7 occurs in the interval between the actual DTC delays for w(n)=1/8 and w(n)=2/8, as indicated by an arrow 401 in FIG. 4. The other information captured in the table value to load at address 7 is the ratio between the following 2 delta-time values: the difference between D(addr=7) and the actual DTC delay for w(n)=1/8 and the difference between actual DTC delay for w(n)=2/8 and for w(n)=1/8.

Through one-time setup at the factory, or periodically during operation, the DTC is measured. This is carried out either using measurement equipment at the factory or using on-chip circuits specially designed to measure the DTC. Specifically, what is measured is pulse delay at the DTC output versus value of the DTC input, w(n). FIG. 4 Line C shows an example of measurement data that might be collected. After collecting the measurements the table values can be computed.

For each address, the value stored at the address is computed as $$\text{value}(addr) = x + 2^{-m}\left(\frac{D(addr) - g_x}{g_{x+2^{-m}} - g_x}\right) = x + 2^{-m}\varepsilon$$

where k is the bit width of the output of the digital block. In FIG. 4 k=5.

m is the bit width of the input of the DTC. In FIG. 4 m=3.

D(addr)=addr×$2^{-k}$×$T_{clk}$ as defined above. By way of examples, in FIG. 4 D(7)=7/32×$T_{clk}$ and D(20)=20/32×$T_{clk}$.

x=the largest value that can be applied to the DTC input, i.e. the largest w(n), without the DTC producing a pulse delay larger than D(addr). The actual pulse delays and D(addr) are plotted together on a time line, as in FIG. 4, and the delay to the left of or exactly coincident with D(addr) is found. Then x is the w(n) corresponding to this point. By way of examples, in FIG. 4 x=1/8 for addr=7 and x=4/8 for addr=20.

$g_x$=actual delay the DTC produces for w(n)=x.

$g_{x+2^{-m}}$=actual delay the DTC produces for w(n)=x+$2^{-m}$ IF $x+2^{-m} < 1.000$ OR Tclk IF $x+2^{-m} = 1.000$.

This equation is designed to achieve a behavior where the ideal delay for the pulse at the DTC output is D(addr) and the quantizer randomly picks either w(n)=x or w(n)=x+$2^{-m}$, where picking w(n)=x results in a pulse delayed by less than the ideal and w(n)=x+$2^{-m}$ results in a pulse delayed by greater than the ideal. Those skilled in the art will recognize that the output of the quantizer dithers between the two quantization levels that bracket, i.e. surround, the unquantized value.

The value stored at the address is in the range [x, x+$2^{-m}$). Since the dither ranges over $-2^{-m-1} \leq d(n) < 2^{-m-1}$ and the quantizer quantizes to the nearest multiple of $2^{-m}$, it can easily be shown that the output of the quantizer either equals w(n)=x or w(n)=x+$2^{-m}$. The exception is when the value stored at the address is exactly equal to x. In this case the probability is 1.0 that the quantizer quantizes to w(n)=x.

The quantizer output has a probability, P, of equaling the level to the left of ideal, i.e. w(n)=x, and a probability 1−P of equaling the level to the right, i.e. w(n)=x+$2^{-m}$. It can be shown that since the dither is a discrete random variable uniformly distributed over the range $-2^{-m-1} \leq d(n) < 2^{-m-1}$ it follows that P equals $1-\epsilon$. The definition of $\epsilon$ is embedded in the equation above. Note that this result, i.e. that $P=1-\epsilon$, assumes that the bit width of the dither source exceeds the bit width of the word stored at the RAM address. Furthermore, epsilon equals the ratio between the following 2 delta-time values: the difference between D(addr) and the actual DTC delay for $w(n)=x$ and the difference between actual DTC delay for $w(n)=x+2^{-m}$ and for $w(n)=x$. Clearly $0 \leq \epsilon < 1$. Note that $\epsilon$ occupies the h-m least significant bits of the word stored in the RAM, and x occupies the m most significant bits.

For every table value stored in the RAM there is a corresponding value of $\epsilon$ and of $P=1-\epsilon$. By way of example, for address 7 there is a corresponding value of $P=1-\epsilon$. There is also a corresponding value of x, the quantization level to the left. The average delay obtained in cycles in which the address equals 7 is $g_x \times P + g_{x+2^{-m}} \times (1-P)$, where $g_x$, as defined above, is the delay that is actually obtained (including mismatch error) when $w(n)=x$ and $g_{x+2^{-m}}$ is the delay actually obtained when $w(n)=x+2^{-m}$. In other words, the average delay over a collection of an infinite number of cycles in which address equals 7, is given by $g_x \times P + g_{x+2^{-m}} \times (1-P)$. The average delay (computed with this expression) equals the ideal delay, D(addr=7), to a good accuracy assuming good measurements. In the limit as the measurements are perfect, and the bit width of the RAM word is infinite, the average delay approaches the ideal delay. It can be shown that the level of the highest spur in the spectrum of the synthesizer output depends on the accuracy of the lookup table, while the accuracy of the lookup table depends on the accuracy of the measurements.

The value of $\epsilon$, which as mentioned above is held in the least significant bits of the word stored in the RAM, controls P. x and $\epsilon$ together control the average delay. The value of $\epsilon$ is found using the above equation, using the measurements taken on the DTC.

In the DDS 300 shown in FIG. 3 the modulo block 313 has the same functionality as in the prior art DDS. In a cycle in which q(n)=1.000 the modulo block outputs q(n)=don't_care and en2(n)=0. Furthermore, in the next clock cycle, cycle # n+1, the modulo block outputs q(n+1)=0 and en2(n+1)=1. Thus q(n)=1.000 produces q(n+1)=0.000 in cycle n+1, corresponding to a pulse delayed by $T_{clk}$ with respect to the rising edge of clock cycle n. For this reason, the definition of $g_{x+2^{-m}}$ contains an IF statement that sets $g_{x+2^{-m}}$ equal to $T_{clk}$ if $x=1-2^{-m}$.

If the DTC mismatch error is not severe, x in the above equation might be as an example 7/8 for the range of addresses from 27 to 31 or 28 to 31. It should be noted that for $x=7/8$, $x+2^{-m}=8/8=1$. In cycles in which the address is in the range for x=7/8, w(n) dithers between 7/8 in cycle n and 0 in cycle n+1.

If the DTC mismatch error is severe, x in the above equation might be as an example 5/8 even for address=31. This represents a DTC where the delays are significantly larger than nominal. In cycles that have address=31, w(n) dithers between 5/8 and 6/8. The modulo block behaves as a transparent pass-through 100% of the time, since RAM output r(n) never equals 1.000.

In another case where DTC mismatch error is severe, x might be say 7/8 for the entire range of addresses from e.g. 20 to 31. In a cycle that has address in this range, w(n) dithers between 7/8 in cycle n and 0 in cycle n+1.

In the description of an ideal DTC defined herein, the delay for the pulse at the output is zero for w(n)=0, where delay is measured from the rising edge of the clock. In other words for w(n)=0 the rising edge of the output pulse aligns with the rising edge of the reference clock. This is not the only possible identification of ideal delay for w(n)=0, and a different approach might be convenient for certain applications.

For some applications, alignment of the synthesizer output with the reference clock, i.e. the phase with respect to the reference clock, might not be important. The only requirement for the output signal might be the spectral purity, in other words the timing error for spacing the pulses evenly in time. In this case it is convenient to consider the actual delay the DTC produces for w(n)=0 as the ideal delay, for the purpose of computing the RAM table values. In FIG. 3 the ideal delay for w(n)=0 would still align with the actual delay for w(n)=0 even if this would mean it does not align with the rising edge of the reference clock. Note however that once the ideal delay for w(n)=0 is established, there is no flexibility for identifying the ideal delay for w(n) not equal to zero, i.e. the w(n) other than w(n)=0. To maintain spectral purity, the ideal delay versus w(n) are required to be spaced evenly in time at intervals of $2^{-m} \times T_{clk}$, as shown in FIG. 4. Furthermore, once the ideal delay for w(n)=0 is established, there is no flexibility for identifying the ideal delay versus address. The ideal delay for address=0 aligns with the ideal delay for w(n)=0, as shown in FIG. 4. The ideal delay versus address are required to be evenly spaced in time at intervals of $2^{-k} \times T_{clk}$, as also shown in FIG. 4.

Even if the phase with respect to the reference clock is important, there is some flexibility for the method of computing the RAM table values. By way of example, two sequences that produce $F_{out}=2/3 \times F_{clk}$ are v1(n)=0,16,x,0,16,x . . . and v2(n)=30,x,14,30,x,14, . . . Suppose for example the RAM look-up table values are computed with ideal delay for w(n)=0 identified as zero with respect to the rising edge of the reference clock. In other words, identifying the ideal pulse produced with w(n)=0 as aligned with the rising edge of the reference clock. The output of the synthesizer with v1(n) is guaranteed to have edges aligning with the edges of the reference clock (assuming the measurements used in the lookup table calculations are accurate.) Now suppose the RAM table values are computed with the delay the DTC actually produces for w(n)=0 considered the ideal delay for the purpose of computing the RAM table values. The output of the synthesizer with v2(n) might actually have edges closer to aligning with the clock edges than with v1(n). The digital block can be implemented with control logic that steers the phase by outputting for example the sequence v2(n) instead of v1(n).

Thus, the invention involves providing a look-up table within the RAM 305 that maps from $2^k$ equally spaced delays to $2^k$ values for combining with the dither source. The values stored in the look-up table are computed based upon measurements of a DTC 317. The spurious emission levels produced by the DDS 300 will depend on the accuracy of the look-up table while the accuracy of the lookup table will depend on the accuracy of the measurements of DTC 317. The invention as described herein applies when mismatch error is a value other than zero, and unlike the prior art form of dither, is of utility even if the bit width of the digital block output does not exceed the bit width of the DTC input. If the DDS 100 of prior art FIG. 1 produces a modulated sequence at the digital block output and therefore a FM/PM modulated square wave at the DDS output 113, the mismatch error is not periodic. However, if the spectrum of the square wave output 113 were measured with a spectrum analyzer it is still likely spurs due to mismatch error would be observed. This depends on the spectrum analyzer settings that are specified for measuring the spurs. The time that the spectrum analyzer spends in each resolution element depends on the sweep time and other parameters. A method of reducing mismatch error spurs often remains a requirement when the DDS output is modulated.

Figure 5:
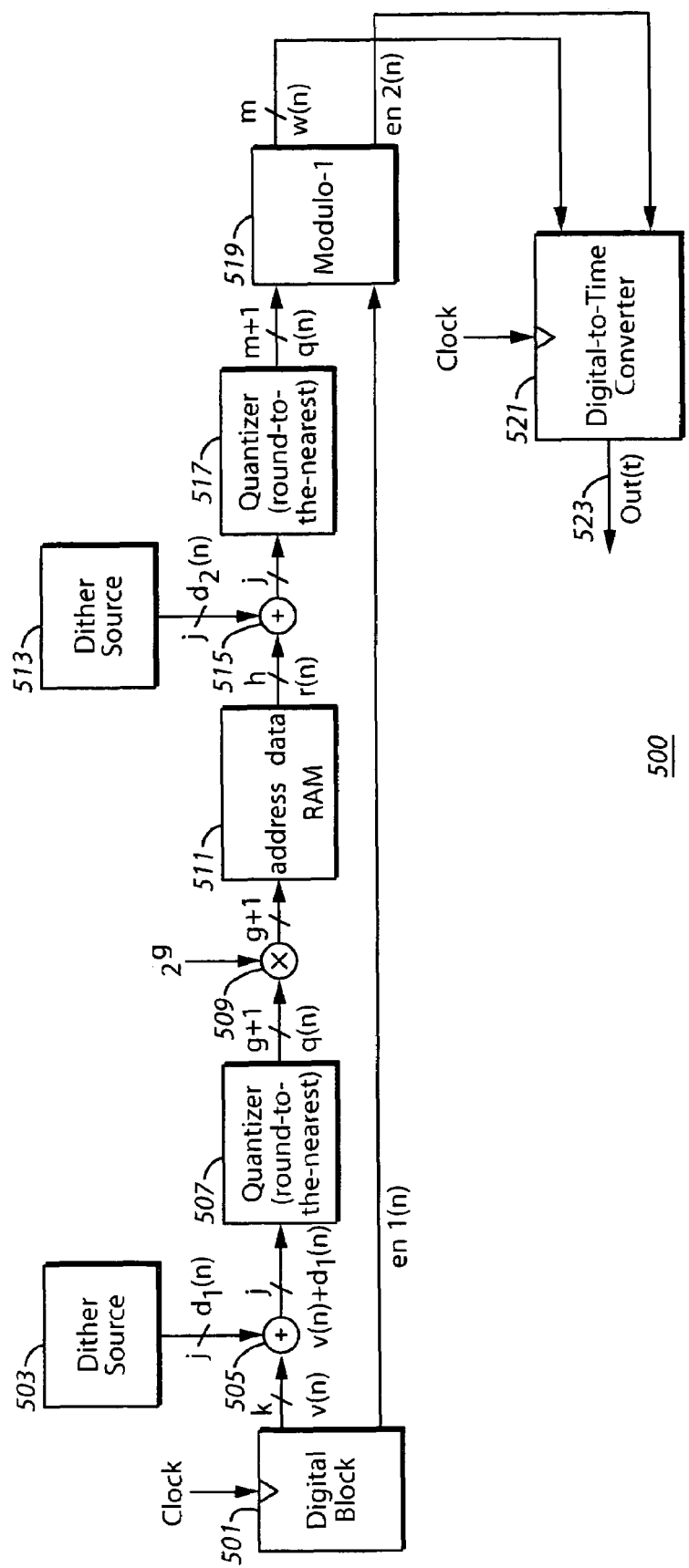
FIG. 5 is an alternative embodiment of the system and method for reducing DTC error as shown in FIG. 3.

FIG. 5 illustrates an alternative embodiment of the invention depicting a direct digital synthesizer 500 that works to provide means to reduce the length of the RAM, i.e., number of addresses. The output of the digital block 501 is rounded to the bit width of the RAM 511 address. As compared with FIG. 3, this is achieved using an additional dither source 503 and quantizer 507. For example, if the RAM 511 is a 32 address RAM, then the quantizer 507 would round the output of the adder 505 to 5 bits. This would then be input to multiplier 509 and supplied to the RAM 511. The data output of the RAM 511 is then fed to adder 515 which combines dither source 513 to provide j bits to quantizer 517. As noted herein, quantizer 517 provides a number ranging from 0 to 1, inclusive, to a modulo block 519. In a cycle in which q(n)=1.000 the modulo block outputs w(n)=don't_care and en2(n)=0. Furthermore, in the next clock cycle, cycle # n+1, the modulo block outputs w(n+1)=0 and en2(n+1)=1. Thus, there are two stages of quantization. The quantizer 507 quantizes data to the bit width of the RAM 511 input. The second quantizer stage which is quantizer 517 works to quantize the RAM output to the bit width of the required input to the DTC 521.

Figure 6:
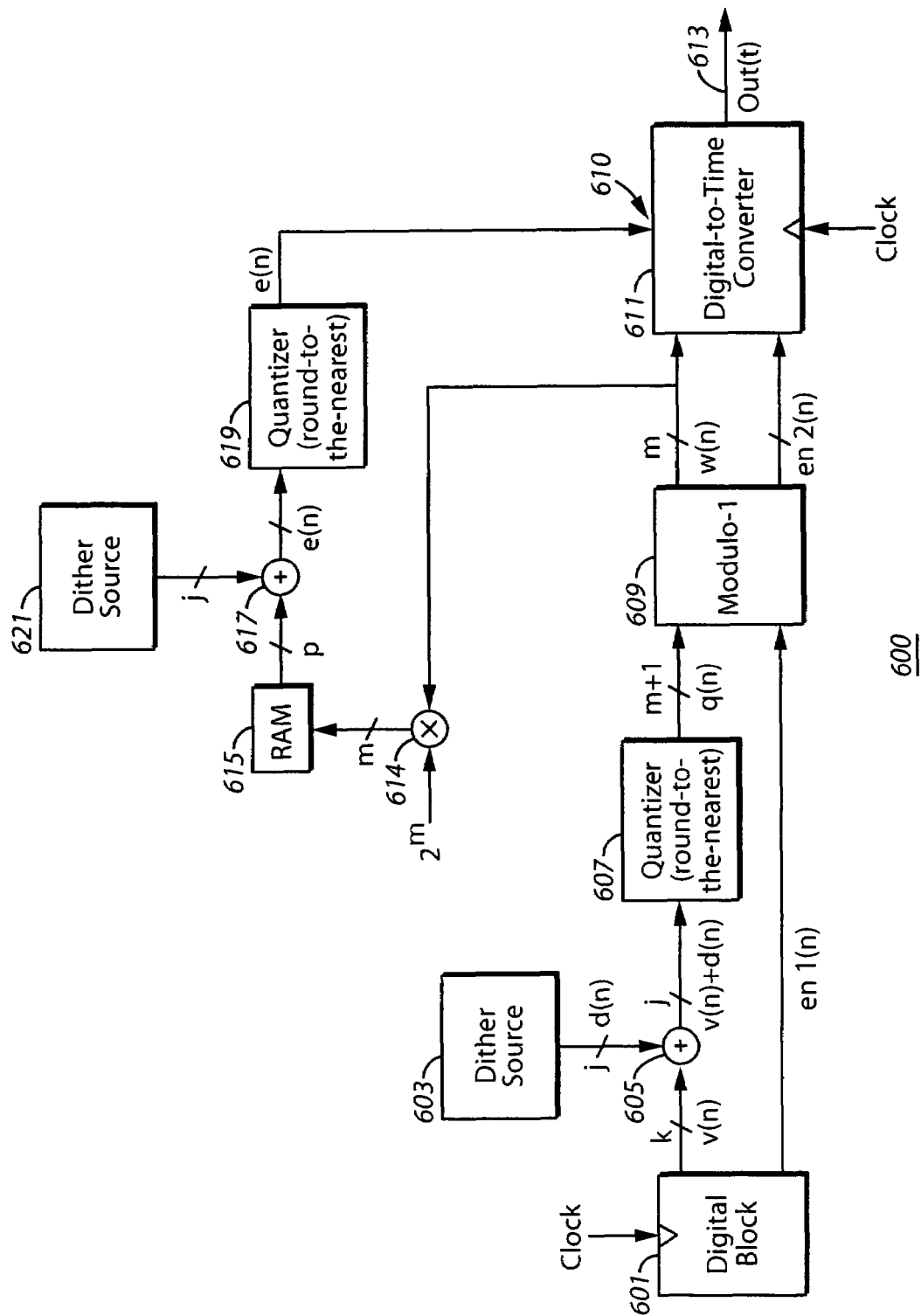
FIG. 6 is yet another alternative embodiment of the system and method for reducing DTC error as shown in FIG. 3.

FIG. 6 illustrates yet another alternative embodiment of the invention depicting a direct digital synthesizer 600 that provides a RAM for mapping from DTC input values to values combined with a dither source, creating a control signal for one or more delay elements in the signal path in the DTC. The control signal is random, with statistics controlled by the table values.

As noted herein summer 605 combines dither source 603 with the output of digital block 601 to provide a j-bit wide number to quantizer 607. The quantizer rounds to the nearest multiple of $2^{-m}$ producing output signal q(n) applied to modulo block 609. The modulo block is transparent to all values of q(n) except q(n)=1.000, which it pushes into the next clock cycle. The output of the modulo block is applied to DTC 611 and multiplier 614. The multiplier supplies the product w(n)×$2^{-m}$, an integer, to the address port of RAM 615 and the value stored there is fetched. The summer 617 computes the sum of the fetched value and the dither source 621. The output of summer 617 is quantized by 2 level quantizer 619. The 1-bit quantizer output e(n) is applied to control port 610 of DTC 611.

The signal e(n) at control port 610 controls a single delay element in the signal path in the DTC. In a cycle in which en2(n)=1 the DTC produces a pulse delayed by w(n)×$T_{clk}$+e(n)×δ+mism{w(n)} where e(n) is 0 or 1 and mism{w(n)} is the mismatch error associated with the value of w(n) in the cycle. The delay element controlled by e(n) introduces a delay of δ if e(n)=1, and zero if e(n)=0.

The dither source is uniformly distributed between −½ and ½ and the values stored in the RAM look-up table are between 0 and 1. Thus in cycle # n the probability P(n) that the quantizer outputs 0 is given by P=1−r(n), where r(n) is the value fetched from the RAM in the cycle. The probability is 1−P that the quantizer outputs 1. Say the value fetched from the RAM in a particular cycle is r(n)=tv(7), where tv(7) is the table value stored at address 7. The average pulse delay at the DTC output, computed over the set of all cycles that fetch the value at address 7, equals $2^{-m}$×7×$T_{clk}$+(1−P)×δ+mism{w(n)= $2^{-m}$×7} where P=1−tv(7) and the term mism{w(n)= $2^{-m}$×7) is the mismatch error associated with w(n)=$2^{-m}$×7. The look-up table values are computed using measured values of mism {w(n)} and to the degree that the measurements are accurate, and accurate table values are loaded in the RAM, the term (1−P)×δ cancels out the mismatch error term.

In a variation on DDS 600, the quantizer 619 outputs 0 and −1 where −1 applied to the control port 610 decreases the delay by an amount delta. In another variation, the quantizer 619 is 2-bits wide and outputs 0, 1, and −1. In still another variation, there is more than one delay element in the signal path in the DTC. A multiplexer incorporated in the DTC can use w(n) for a select input and then routes the control signal at port 610 to one of $2^m$ delay elements. The delay elements provide differing amounts of delta-delay because of mismatch, therefore δ in a particular cycle depends on the particular delay element that is picked in the cycle (and therefore on w(n) in the cycle.)

In summary, the invention defines a new approach to dither that not only eliminates the contribution of the quantization error to spurious emissions, but also reduces the contribution of the mismatch error to these emissions by using at least one dither source and RAM which maps from $2^k$ equally spaced delays to $2^k$ values for combining with a dither source.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A direct digital synthesizer (DDS) including a system for reducing digital-to-time converter (DTC) spurs comprising:
   at least one dither source;
   delay elements in a signal path of the DTC;
   measurement circuitry for taking delay measurements across the DTC;
   a microprocessor for calculating delay error values based on the delay measurements;
   a random access memory (RAM) including a look-up table within which to upload and store the computed delay error values; and
   wherein the output of the look-up table is combined with the dither source for compensating unequal unit delay values in the DTC.

2. The DDS according to claim 1, wherein the delay elements in the signal path of the DTC comprises a digital delay line of series connected inverters multiplexed to an output.

3. The DTC according to claim 2, wherein the series connected inverters are individually adjusted for a delay value.

4. The DTC according to claim 2, wherein an individual delay adjustment is provided in the multiplexed output paths.

5. The DDS according to claim 1, wherein the delay error values are determined, maintained, and updated in the RAM.

6. The DDS according to claim 1, further comprising a discrete processor that determines an ideal delay value of the DTC for routing to an output of the DDS.

7. The DDS according to claim 6, wherein an ideal delay value of the discrete processor is modified by the stored delay error value.

8. The DDS according to claim 7, wherein a modified delay value is produced from the ideal delay value for summing with the at least one dither source.

9. The DDS according to claim 1, wherein the value produced by combining the output of the look-up table with the dither source is rounded.

10. The DDS according to claim 1, wherein the value produced by combining the output of the lookup table with the dither source is provided as an input to the DTC for providing adjustable delay.

11. A direct digital synthesizer (DDS) that includes a dither source for reducing digital-to-time converter (DTC) spurs comprising:
   a digital block for providing a bit number k;
   measurement circuitry for measuring delays of pulsed waveforms of the DTC;
   a microprocessor for computing delay error values based on the measured delays;
   a random access memory (RAM) for receiving the computed delay error values and mapping delay requested by the digital block to a corresponding output delay h;
   an adder for combining the dither source with output delay h to produce a j bit delay number;
   at least one quantizer for rounding the j bit delay number to m+1 bits;
   a modulo for arithmetically manipulating the m+1 bits to m bits, the modulo
   supplying an m bit number to the DTC and to an address port of the RAM, as an integer; and
   wherein the DDS overcomes the contribution of quantization error and mismatch error based on the m bit number for reducing spurious emissions.

12. The DDS according to claim 11, wherein the DTC comprises a digital delay line of series connected inverters multiplexed to an output.

13. The DTC according to claim 12, wherein the series connected inverters are individually adjusted for a delay value.

14. The DTC according to claim 13, wherein the individual delay adjustment is provided in the multiplexed output paths.

15. The DDS according to claim 11, wherein DTC delay error values are determined, maintained, and updated in the RAM.

16. The DDS according to claim 11, wherein the number supplied to the DTC provides an adjustable delay.

17. A method for overcoming the contribution of quantization error and mismatch error in a direct digital synthesizer (DDS) comprising the steps of:
   providing a number k that has a predetermined bit width from a digital source;
   measuring delay values on a delay line within a DTC;
   computing delay errors based on the measured delay values;
   calculating lookup table values based on the computed delay errors;
   loading the lookup table values into a random access memory (RAM);
   supplying the number k as an address to the RAM;
   fetching the lookup table value loaded within the RAM at the address k;
   combining the value fetched from the RAM with a dither source to provide a number j;
   quantizing the number j to a delay number m+1 value;
   arithmetically adjusting the number m+1 value to a number m representing delay; and
   supplying the number m to the digital-to-time converter (DTC) for reducing DTC spurious emissions of the DDS.

18. The DDS according to claim 17, wherein the value in the look-up table includes both the largest value that can be applied to an input of the DTC in order to obtain an actual delay and the frequency upon which that value is chosen.

19. The DDS according to claim 18, wherein the actual delay is the delay that includes mismatch error that is less than a predetermined amount of delay.

20. The DDS according to claim 17, wherein the look-up table value are chosen in a ratio to provide an average delay that approaches an ideal delay.

21. The DDS according to claim 17, wherein the DTC comprises a digital delay line of series connected inverters multiplexed to an output.

22. The DTC according to claim 21, wherein the series connected inverters are individually adjusted for a delay value.

23. The DTC according to claim 22, wherein the individual delay adjustment is provided in the multiplexed output paths.

24. The DDS according to claim 17, wherein DTC delay error values are determined, maintained, and updated in the RAM.

25. The DDS according to claim 17, wherein the number supplied to the DTC provides an adjustable delay.

* * * * *